Sept. 4, 1956
E. M. SEAGRAVE, JR
2,761,317
PRESSURE GAUGE
Filed Dec. 13, 1952
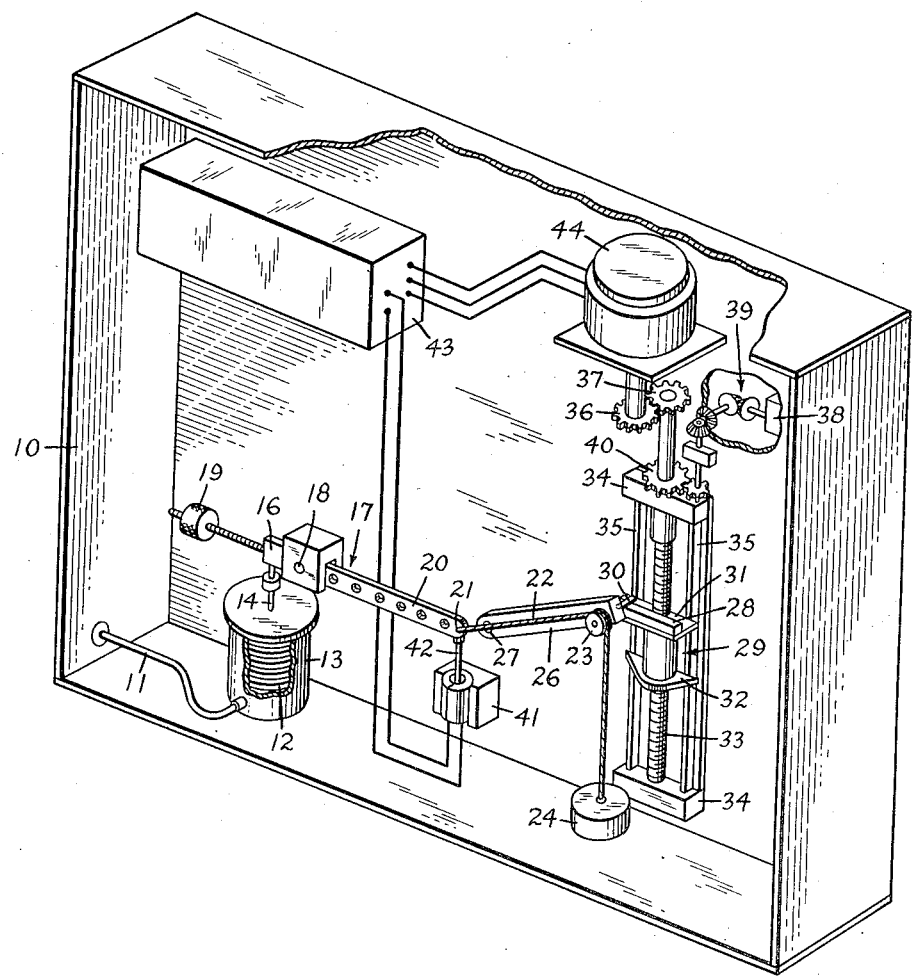
INVENTOR.
EARL M. SEAGRAVE, JR.
BY
ATTORNEYS.

United States Patent Office 2,761,317
Patented Sept. 4, 1956

2,761,317

PRESSURE GAUGE

Earl M. Seagrave, Jr., Cumberland, Md., assignor to Celanese Corporation of America, New York, N. Y., a corporation of Delaware Application December 13, 1952, Serial No. 325,866

5 Claims. (Cl. 73—388)

This invention relates to apparatus for measuring forces and relates more particularly to pressure gauges.

In the usual pressure gauges, the pressure to be measured is applied to an elastic measuring element, such as a Bourdon tube, helix or spiral. The movement of this elastic element, when suitably calibrated, provides an indication or measure of the pressure applied to the elastic element. It would be most desirable to employ a perfectly elastic element in which the movement of the element in response to the pressure would be directly proportional to the pressure. However, such perfectly elastic elements are not available, and those elements which are nearly perfectly elastic generally have a very narrow range of proportional response. Even the best types of such elements are generally subject to hysteresis and creep. In addition, any pressure gauge which uses the movement of an elastic element for positioning an indicating pointer has only a limited force available to act on the pointer and this force falls off rapidly as the pointer approaches its final position. Accordingly, where very high precision of measurement is required, this type of pressure gauge must be constructed with great accuracy, mechanical refinements must be introduced in an effort to compensate for inherent errors of the instrument, and the gauge must be calibrated by hand over the whole range of pressures. A fairly accurate pressure gauge of this kind is therefore quite expensive.

Another type of instrument, in which pressures may be measured quite accurately, is a U-tube manometer filled with liquid. However, this type of instrument is not suitable where it is necessary to make frequent rapid measurements, since a measurement of the pressure requires readings of the liquid in two legs of the manometer and a subtraction of one reading from the other, and also requires a measurement of the temperature of the manometer fluid and the application of a density correction factor. Furthermore, variations in humidity may make the readings of the manometer inaccurate, since many commonly-used manometer fluids change in density on contact with water vapor. Moreover, if it is desired to provide an easily read manometer having many scale divisions, the instrument must be made very large.

It is an important object of this invention to provide a novel apparatus for measuring pressure which will be free from the foregoing and other defects.

A further object of this invention is the provision of a novel pressure gauge which will be sensitive to small changes in the pressure being measured, accurate and give reproducible readings, be easily read, economical to construct, and which will not require special calibration.

Other objects of this invention will appear from the following detailed description and claims.

According to this invention, an apparatus for measuring pressure comprises a movable means having a balanced or null position, means for applying a force to be measured to said movable means whereby to urge the movable means away from its null position, and means, such as a strand of suitable material, maintained under a substantially constant total stress. The latter means is adapted to transmit this total stress to the movable means and is so connected to the movable means that one component of this total stress is exerted in a direction effective to oppose the urging of the movable means from its null position by the force to be measured, while another component of said total stress, perpendicular to the first component, is exerted in a direction which has no opposing effect on the movement of said movable means. The relative values of these two components of the total stress are dependent on the position of the stressed means. The apparatus includes means for varying the position of the stressed means and means for indicating the position of the stressed means. The means for varying the position of the stressed means is responsive to movement of the movable means away from its null position and acts automatically to vary the position of the stressed means until the movable means is restored to its null position.

In a preferred embodiment of this invention, the movable means having a null position is a weigh beam mounted for pivotal movement about a fulcrum point. The pressure to be measured is applied vertically to one side of the beam by a bellows transmitting a force proportional to the pressure to be measured. This force tends to rotate the beam about its fulcrum and is opposed by a force applied by a weighted strand attached to the other side of the beam. The strand, which may be a suitable string, wire or metal band, is supported at an angle to the beam by a guide roller mounted on a pivoted arm. The position of the pivoted arm determines the angle which the strand makes with the beam and therefore determines how much of the force applied by the weighted strand is in the vertical, or effective, component, which component tends to rotate the beam about its fulcrum, and how much is in the horizontal, or ineffective, component, which is applied in the direction of the fulcrum of the beam. Near its guide roller the pivoted arm is slidably supported on a horizontal surface of a block, which in turn is threaded on, and carried by, a vertical micrometer screw. The block is prevented from rotating on the micrometer screw, so that rotation of the screw causes vertical movement of the block and thereby varies the position of the pivoted arm and thus varies the angle of the strand. A cyclometer is provided for indicating the number of turns of the screw. It can be demonstrated, from the geometry of this system, that the number of rotations of the screw away from the zero position, i. e. the position where the block is so situated that the strand is in the horizontal plane of the beam, is directly proportional to the value of the vertical, or effective, component of the force applied by the strand. In operation, the screw is rotated until the beam is brought to its balanced horizontal position, i. e. its null position, at which point the moment of the vertical component of the force applied by the strand exactly balances the moment, about the fulcrum of the beam, of the force of the bellows. When such balance is attained, a reading of the cyclometer, showing the number of turns of the screw, provides a measurement of the pressure in the bellows.

In the preferred embodiment of this invention, the micrometer screw is moved automatically to maintain the beam in its null position. Thus, I provide means, responsive to movement of the beam away from its null position, for rotating the micrometer screw until the beam is restored to said null position. This means includes a sensing device, such as a linear variable differential transformer, for sensing the position of the beam, an amplifier electrically connected with the sensing device and a servomotor electrically connected with the amplifier. The servomotor is provided with a gear for rotating the micrometer screw. When the beam moves out of its null position, due to a change in pressure in the bellows, the sensing device, acting through the amplifier, causes the servomotor to operate until the beam is restored to the null position. When the beam is in null position, no movement of the servo mechanism takes place.

The pressure measuring apparatus of this invention has proved to be very sensitive and precise, capable of being read quickly and accurately, and economical to construct. This apparatus is adaptable for the measurement of a wide range of pressures, does not require calibration over the whole range and has good freedom from temperature effects. It should be noted that the apparatus does not depend for its operation on the response of any elastic element. The bellows is not employed as an elastic element but merely as a means for transmitting the pressure of the fluid; in the null position at which measurements are taken the bellows is always in the same position.

Referring now to the drawing, wherein there is shown a preferred embodiment of the apparatus of this invention, numeral 10 indicates a box-like frame for supporting the apparatus and numeral 11 designates a conduit connecting the apparatus of this invention to the source of the fluid whose pressure is to be measured. This conduit 11 is connected with a bellows 12, of conventional construction, enclosed in a housing 13 mounted on the frame 10, which bellows is provided at its upper end with a movable rod 14. The fluid supplied to bellows 12, if under sufficient pressure, expands the bellows, thus urging the rod 14 upwardly with a force proportional to the pressure of the fluid supplied to conduit 11. Rod 14 is operatively connected to one side 16 of a beam 17 which is mounted horizontally for limited pivotal movement about fulcrum point 18 which is mounted on the frame 10. An adjustable threaded counterweight 19 is provided to balance the beam 17 at its null position. On its other arm 20, the beam 17 has attached thereto at 21 a string 22 which passes over a guide pulley 23 and supports a counterweight 24.

The pulley 23 is mounted at one end of a pivoted arm 26, which is pivoted at its other end on a pivot pin 27 mounted on the frame 10 and so located that its axis, if extended, would pass through the beam 17 at the point of attachment 21 of string 22 when the beam 17 is in its null position. Thus, the pulley 23 moves in an arc of a circle whose center is at the point of attachment 21 of the string 22 to the beam end. The pivoted arm 26 is slidably supported on an upper horizontal surface 28 of a block 29, as by the engagement of a pin 30 with the surface 28. Pin 30 is mounted on said arm 26 in such a way that its center is opposite the upper point of tangency of string 22 and pulley 23. Block 29 is provided with spaced upper and lower wings 31 and 32, respectively, and is threaded on a long vertical rotatable micrometer screw 33, journaled for rotation in upper and lower bearings 34 mounted on the frame 10. The block 29 is prevented from rotating about the axis of said micrometer screw by the engagement of its spaced wings 31 and 32 with a pair of vertical tracks 35 mounted between the two bearings 34 and running parallel to the micrometer screw 33. The micrometer screw 33 is rotated by a gear wheel 36 which meshes with a driven gear 37 keyed to the upper end of said micrometer screw.

In the construction described above, the total force exerted by the string 22 on the beam 17 is constant and is equal to the weight of the counterweight 24. This total force may be resolved into two components, i. e. a horizontal component directed along the length of the beam 17 and exerting no tilting moment on said beam when said beam is in a horizontal position, and a vertical component, which does exert a tilting moment on the beam 17. By drawing the vectors corresponding to the total force and its horizontal and vertical components, it will readily be seen that the vertical component is directly proportional to the vertical distance between the point of attachment 21 of the string 22 on the beam end and a point on the pulley 23. Since each turn of the micrometer screw 33, acting through the block 29, moves the pulley 23 a fixed distance vertically, a measurement of the number of turns of the screw 33 provides an indication of the vertical force exerted by the weighted string 22 on the end of the beam 17. Such a measurement of the number of turns of the screw is provided by an indicating cyclometer 38 mounted on the frame 10 and connected by suitable gearing, designated generally by reference numeral 39, to a gear wheel 40 keyed to screw 33. Thus, the force applied to the rod 14 by the bellows 12 may be measured by rotating the screw 33 until the beam 17 is in null position, at which position the moment of the vertical force exerted by the weighted string 22 will balance the moment of the force exerted by rod 14. The reading of the indicating cyclometer 38, which is suitably calibrated, gives a reading of the pressures of the fluid being measured.

In the apparatus of this invention, the rotation of the screw 33 to bring the beam 17 to null position is carried out automatically, by means of a linear variably differential transformer 41, of conventional construction, mounted on the frame 10, the core of which transformer is connected by a rod 42 to arm 20 of the beam 17. The transformer 41 is electrically connected to a suitable electrical vacuum tube amplifier 43, mounted on the frame 10, which amplifier is electrically connected to, and controls the movement of, a suitable two-phase servomotor 44, also mounted on the frame 10. The servomotor 44 drives the gear wheel 36 meshing with the gear 37 keyed to the upper end of the micrometer screw 33. The transformer 41 serves as a device for sensing the position of the beam 17; more particularly, for sensing whether or not said weigh beam is in its null position, or above or below the null position. When the beam 17 is above or below its null position, the transformer 41 acts through the amplifier 43 and servomotor 44 to reposition the screw 33 until said beam is once more in null position. When the beam 17 reaches the null position, the servomotor 44 stops.

The linear variable differential transformer 41 is a solenoidally wound coil consisting of one primary and two secondary sections and an iron core free to move axially in the transformer. The coils are usually wound separately and assembled end-to-end, although the primary and secondary windings may be distributed throughout the length of the solenoid. The windings, whether of the lumped or distributed type, are arranged so that the flux linkage between the primary and each secondary is equal. If, then, alternating voltage, generally about 6–10 volts, is applied to the primary winding and the secondary windings are connected in series-opposing fashion, the normal output voltage of the transformer is zero when the core is in its neutral position, i. e., is centered axially in the coil. The core and the rod 42 are so connected that the core is in its neutral position when the beam 17 is in its null position. However, a slight displacement of the core from the neutral position will increase the flux linkage between the primary and one secondary while decreasing the linkage to the other secondary. The output voltage of the transformer 41 therefore is zero when the core is in its neutral position and increases when the core is displaced in either direction. Displacements in one direction give a voltage which is 180° out of phase with the voltage obtained when the core is displaced in the other direction. The value of the voltage is an indication of the amount of core displacement from the neutral position and the phase of the voltage is an indication of the direction of that displacement.

The vacuum-tube amplifier 43 used with this transformer consists of voltage and power amplifying sections. The voltage amplifier uses as an input the signal from the transformer 41, which it then amplifies to an intensity sufficient to operate the power amplifiers. The output of the power amplifiers energizes the field windings of the two-phase servomotor 44. The servomotor is so constructed that it will rotate in one direction when its field windings are energized with voltages which are in phase with the line voltage and will rotate in the other direction when the field voltage is 180° out of phase with the line voltage. When the field windings are not energized, the motor will not rotate.

It is to be understood that the foregoing detailed description is given merely by way of illustration and that many variations may be made therein without departing from the spirit of my invention.

Having described my invention, what I desire to secure by Letters Patent is:

1. A force measuring apparatus, comprising a pivoted lever having a null position, means operatively connected to said lever for applying thereto a force to be measured, which force causes said lever to be moved from its null position, a strand connected to said lever at a point spaced from the pivot axis of the lever, a free-hanging weight carried by said strand for maintaining said strand under a substantially constant total tension, means supporting the strand at a point intermediate the weight and the point of attachment of the strand to the lever, said supporting means being positioned so that the supporting means is spaced from the point of attachment of the strand to the lever, whereby one component of said total tension is exerted in a direction effective to oppose the movement, by said force, of said lever from its null position and the other component of said total tension, perpendicular to said first component, is exerted in a direction ineffective to oppose the movement of said lever, means for moving the supporting means to vary the angular relation of said strand and said lever whereby the values of said components are varied, and means for indicating the position of said strand.

2. A force measuring apparatus as in claim 1 including an arm pivotally mounted adjacent said lever, and a guide for said strand carried by said arm and serving as the supporting means for said strand, said strand being trained around said guide.

3. A force measuring apparatus in claim 2 including a rotatable screw means, means carried by said screw means and connected to said arm to move said arm on rotation of said screw means, and means responsive to the movement of the lever from its null position for rotating said screw means.

4. A force measuring apparatus as in claim 3 including a block carried by said rotatable screw means, and a pin carried by said arm, said pin resting on and moving with said block during the movement of said block upon rotation of the screw means.

5. A force measuring apparatus as in claim 4 in which the surface of the block upon which the pin rides extends in a straight line at right angles to the axis of the screw whereby the number of rotations of the screw is directly proportional to the component of the total tension which opposes the movement of the lever.

References Cited in the file of this patent

UNITED STATES PATENTS

| 2,013,252 | Pigott | Sept. 3, 1935 |
| 2,107,976 | Blasig | Feb. 8, 1938 |
| 2,412,541 | Shivers | Dec. 10, 1946 |

FOREIGN PATENTS

| 681,544 | Germany | Sept. 25, 1939 |
| 698,189 | Germany | Nov. 4, 1940 |